United States Patent
Cheong et al.

(10) Patent No.: US 8,761,139 B2
(45) Date of Patent: Jun. 24, 2014

(54) APPARATUS AND METHOD FOR SUPPORTING ACCESS IN COMMUNICATION SYSTEM

(75) Inventors: Minho Cheong, Daejeon (KR);
Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 243 days.

(21) Appl. No.: 13/336,869

(22) Filed: Dec. 23, 2011

(65) Prior Publication Data
US 2012/0163360 A1 Jun. 28, 2012

(30) Foreign Application Priority Data

Dec. 23, 2010 (KR) .......................... 10-2010-0133975
Dec. 22, 2011 (KR) .......................... 10-2011-0140348

(51) Int. Cl.
*H04W 4/00* (2009.01)
(52) U.S. Cl.
USPC ........................................................ 370/338
(58) Field of Classification Search
USPC ......... 370/338, 329, 310, 477, 236, 336, 347, 370/394, 350, 330, 232, 253; 709/228, 232
See application file for complete search history.

(56) References Cited

U.S. PATENT DOCUMENTS

| | | | |
|---|---|---|---|
| 7,787,845 B2 * | 8/2010 | Lindoff et al. | 455/226.1 |
| 7,894,503 B2 * | 2/2011 | Azenkot et al. | 375/133 |
| 7,948,939 B2 * | 5/2011 | Sugaya et al. | 370/329 |
| 2006/0280152 A1 | 12/2006 | Lee et al. | |

FOREIGN PATENT DOCUMENTS

KR  10-2006-0124593 A  12/2006

* cited by examiner

*Primary Examiner* — Chi Pham
*Assistant Examiner* — Alexander O Boakye

(57) ABSTRACT

Disclosed are an apparatus and a method for supporting access for a multi user to perform communication through a multi node by efficiently using a multi channel in a communication system of a multi user environment having the multi node, in which bands usable by STAs that intend to access an access point are searched in a multi channel; a transmission band for packet transmission is determined in the searched usable bands; and access to the access point is supported through the determined transmission band, and the transmission band is determined by performing ad-hoc through an ad-hoc media access control (MAC) protocol in the searched usable bands.

14 Claims, 6 Drawing Sheets

APPARATUS AND METHOD FOR SUPPORTING ACCESS IN COMMUNICATION SYSTEM

CROSS-REFERENCES TO RELATED APPLICATIONS

The present application claims priority of Korean Patent Application Nos. 10-2010-0133975 and 10-2011-0140348, filed on Dec. 23, 2010, and Dec. 22, 2011, respectively, which are incorporated herein by reference in their entirety.

BACKGROUND OF THE INVENTION

1. Field of the Invention

Embodiments of the present invention relate to a communication system, and more particularly, to an apparatus and a method for supporting access for multi users to perform communication through multi nodes by efficiently using multi channels in a communication system of a multi user environment having the multi nodes.

2. Description of Related Art

In a current communication system, a research for providing services of various qualities of service (QoS) having a high transmission rate to users is in active progress. In a wireless local area network (WLAN) (hereinafter, referred to as 'WLAN') as one example of the communication system, a research into methods for rapidly and stably transmitting massive data through limited resources is in active progress. In particular, in the communication system, a research into transmission of data through a wireless channel is in progress. In recent years, methods for the WLAN system to normally transmitting and receiving the massive data by effectively using a limited wireless channel have been proposed.

Meanwhile, in the current communication system, i.e., the WLAN system, respective users have a network environment having a plurality of access nodes so as a plurality of users to receive services rapidly by efficiently using the limited channels. However, in the aforementioned WLAN system, a time when the channel is not used is frequently generated according to the number of users allocated to the channels and the amount or form of traffic, and as a result, use efficiency of the limited channel deteriorates. In order to solve the problems, in recent years, methods for performing communication by more efficiently using the limited channel with a media access control (MAC) (hereinafter, referred to as an 'MAC') (hereinafter, referred to as a 'multi-channel MAC') technology have been variously considered, but detailed methods have not yet been presented.

Therefore, there are required detailed access methods for the respective users to perform communication through the plurality of access nodes by efficiently using the multi channels in a network environment in which the plurality of users have the plurality of access nodes, respectively in the aforementioned communication system, i.e., the WLAN system.

SUMMARY OF THE INVENTION

Accordingly, an embodiment of the present invention is directed to provide an apparatus and a method for supporting access in a communication system.

Further, another embodiment of the present invention is directed to provide an apparatus and a method for supporting access in a communication system in a multi user network environment having multi nodes.

In addition, yet another embodiment of the present invention is directed to provide an apparatus and a method for supporting access for respective users to perform communication through a plurality of access nodes by efficiently using a limited channel in a network environment in which a plurality of users have a plurality of access nodes in a communication system.

Moreover, still another embodiment of the present invention is directed to provide an apparatus and a method for supporting access for multi users to stably receive services through multi channels, respectively by using a multi channel MAC technology in a WLAN system in a multi user network environment having multi nodes.

In accordance with an embodiment of the present invention, an apparatus for supporting access in a communication system, includes: a verifying unit configured to search bands usable by STAs that intend to access an access point in a multi channel; a determining unit configured to determine a transmission band for packet transmission in the searched usable bands; and an accessing unit supporting access to the access point through the determined transmission band, wherein the determining unit determines the transmission band by performing ad-hoc through an ad-hoc media access control (MAC) protocol in the searched usable bands.

In accordance with another embodiment of the present invention, a method for supporting access in a communication system, includes: searching bands usable by STAs that intend to access an access point in a multi channel; determining a transmission band for packet transmission in the searched usable bands; and supporting access to the access point through the determined transmission band, wherein in the determining, the transmission band is determined by performing ad-hoc through an ad-hoc media access control (MAC) protocol in the searched usable bands.

DESCRIPTION OF SPECIFIC EMBODIMENTS

Figure 1:
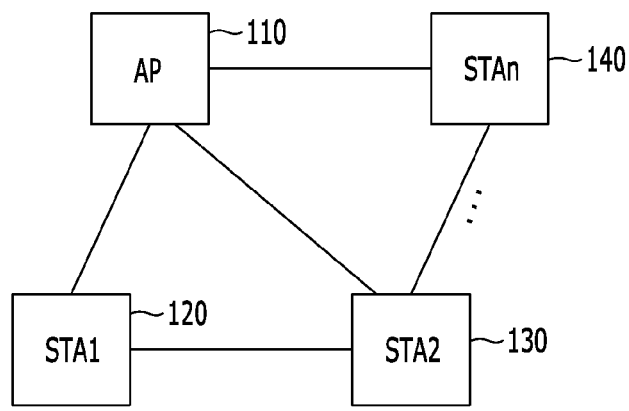
FIG. 1 is a schematic diagram of a structure of a communication system according to an embodiment of the present invention.

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention presents an apparatus and a method for transmitting and receiving data in a communication system, i.e., a wireless LAN (wireless local area network (WLAN), hereinafter, referred to as a 'WLAN') system. Herein, in an embodiment of the present invention, the WLAN system, i.e., an institute of electrical and electronics engineers (IEEE) 802.11 system is described as one example, but a data transmitting/receiving method proposed in the present invention may be applied even to other communication systems.

Further, in the embodiment of the present invention, access of a WLAN system is supported so that a plurality of STAs perform communication through respective multi nodes by efficiently using a limited channel in a communication system in a network environment in which terminals of multi users, e.g., a plurality of users, e.g., a plurality of stations (STAs, hereinafter, referred to as an 'STAs') have a plurality of access nodes, i.e., the multi nodes. Herein, in the embodiment of the present invention, the plurality of STAs support a multi channel media access control (MAC, hereinafter, referred to as an 'MAC') (hereinafter, referred to as a 'multi channel MAC') protocol to perform communication by accessing a network through the plurality of access nodes, respectively and the plurality of STAs perform communication through the access nodes, respectively by using the multi channel MAC protocol, and as a result, services are stably provided to the plurality of users through the limited channel, e.g., multi channels. For example, the channel includes three orthogonal channels in an IEEE 802.11b system as one example of an IEEE 802.11 system and includes 12 available channels in an IEEE 802.11a system.

In addition, in the embodiment of the present invention, the multi channel MAC protocol is proposed as a protocol between the STAs of the network so that the respective access nodes perform communication simultaneously in the network environment in which the plurality of STAs have the plurality of access nodes. The STAs of the network are accessed to each other through the respective access nodes by supporting the multi channel MAC protocol to thereby perform communication. Herein, in the embodiment of the present invention, M multi channels and N STAs are set, N×M access nodes are determined in the network according to the setting, and the multi channel MAC protocol is applied to the determined N×M access nodes, and as a result, the access is achieved in the network. In this case, in the embodiment of the present invention, in order to apply the multi channel MAC protocol with respect to the N×M access nodes, first, the multi channel MAC protocol is applied to the N×M access nodes corresponding to all of the plurality of STAs and a grouped multi channel MAC protocol is applied in application and approval of access to an Ad-hoc multi channel MAC protocol.

Further, in the embodiment of the present invention, network formation of multiple devices generated, use of one predetermined device of wireless resources among the multiple devices, and sharing of the wireless resources, which occur in an ad-hoc wireless network system as one example of the communication system are supported through a multi channel MAC. Herein, the ad-hoc wireless network system as a self-organizing system which can be organized by only a mobile device without an additional infrastructure is a system which can adaptively respond to the communication environment of the network.

Moreover, in the embodiment of the present invention, one predetermined AP among a plurality of access points (hereinafter, referred to as 'APs') supports access to the STAs having the plurality of access nodes through the multi channels and accesses among the STAs by using the multi channel MAC in a basic service set (BSS) (hereinafter, referred to as a 'BSS') of the WLAN system as one example of the communication system. In addition, in the embodiment of the present invention, in the case where the respective STAs have the plurality of access nodes in the communication system of the multi channel network environment where one AP and the plurality of STAs are provided, e.g., the WLAN system, multi-rendezvous are supported and the multi channel MAC protocols is applied in order to support the multi-rendezvous.

Further, in the embodiment of the present invention, in the WLAN system as the communication system of the multi channel network environment where one AP and the plurality of STAs respectively having the plurality of access nodes are provided, an accessible band in the multi channels is searched and thereafter, the access is achieved through the searched band by supporting the multi channel MAC to provide the services to the multi users by transmitting and receiving service data through the multi channels so that the access and the multiple-rendezvous of the STAs are enabled through the multi channels. In this case, the interference can be minimized at the time of transmitting and receiving the service data and an overall data throughput of the system can be improved as the service data are transmitted and received by using at least two channels interference between the channels is minimized, i.e., the multi channels. Then, herein, the communication system according to the embodiment of the present invention will be described in more detail with reference to FIG. 1.

FIG. 1 is a schematic diagram of a structure of a communication system according to an embodiment of the present invention. Herein, FIG. 1 is a schematic diagram a structure of the WLAN system as one example of the communication system according to the embodiment of the present invention.

Referring to FIG. 1, the WLAN system includes one predetermined AP 110 and for example, N STAs 120, 130, and 140 as a plurality of user terminals. Herein, The N STAs 120, 130, and 140 have one or more access nodes, e.g., M access nodes, and as a result, the WLAN system includes N×M access nodes and uses a multi channel MAC protocol in order to support access of the N STAs 120, 130, and 140 through the N×M access nodes.

Further, in FIG. 1, a control unit (not shown) which is provided in each of the STAs 120, 130, and 140 or an upper end of each of the STAs 120, 130, and 140 supports the accesses of the N×M access nodes that are provided in the WLAN system. Then, herein, the multi channel MAC protocol of the communication system according to the embodiment of the present invention will be described in more detail with reference to FIGS. 2 to 5.

Figure 2:
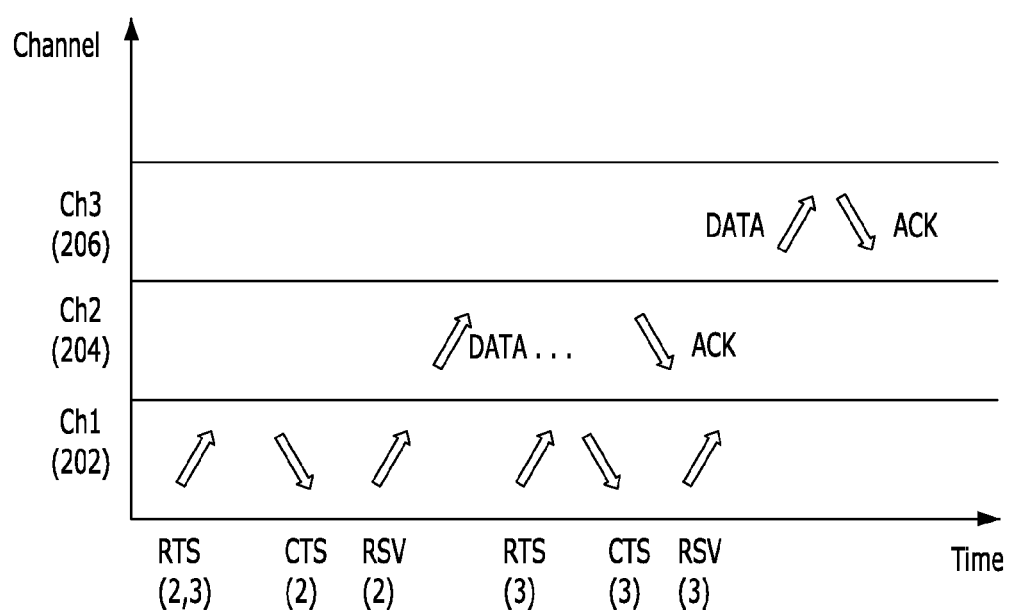
FIGS. 2 to 5 are diagrams showing a multi channel MAC protocol for supporting access of STAs in the communication system according to the embodiment of the present invention.
Figure 3:
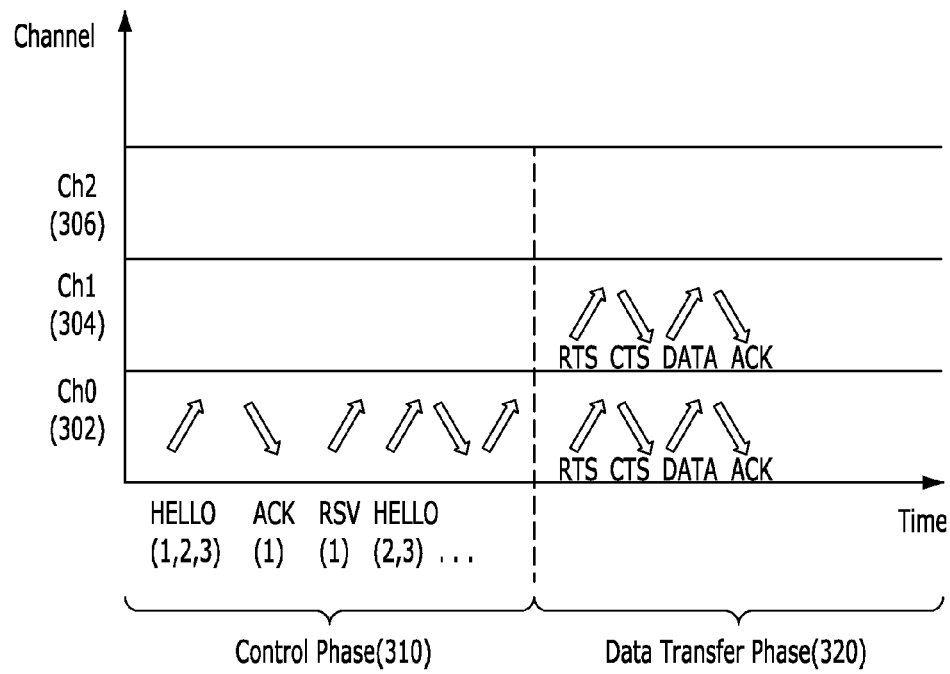
Figure 4:
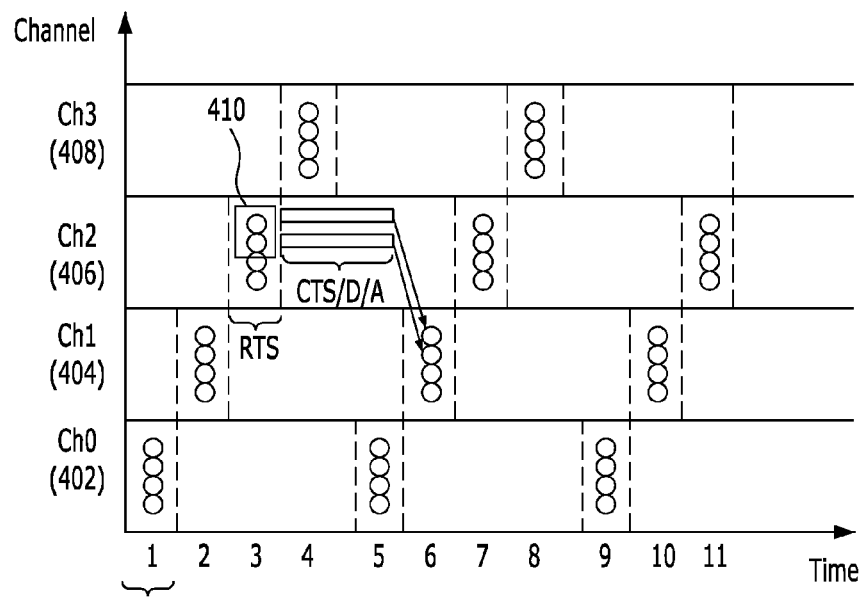
Figure 5:
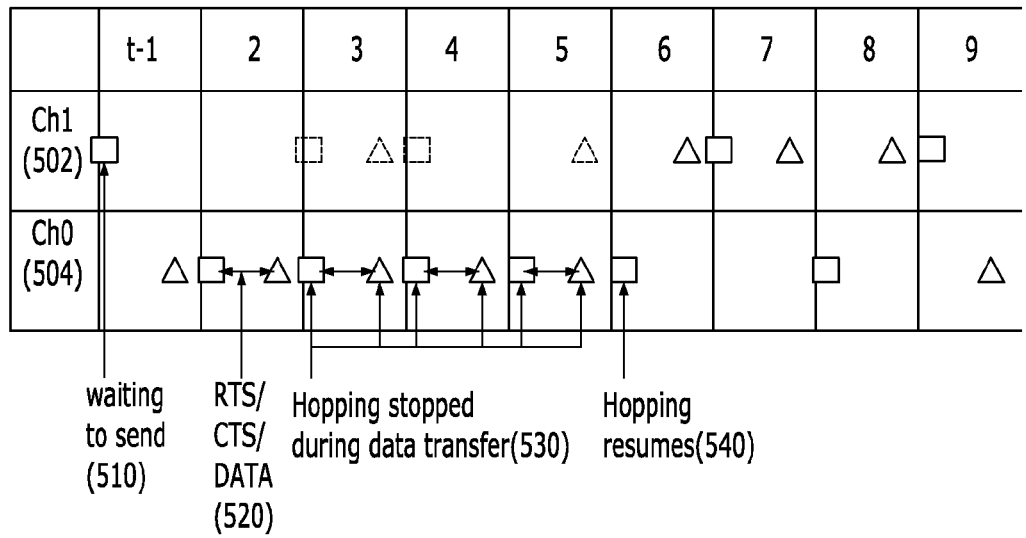

FIGS. 2 to 5 are diagrams showing a multi channel MAC protocol for supporting access of STAs in the communication system according to the embodiment of the present invention. Herein, FIGS. 2 to 5 are diagrams schematically showing examples of methods using the multi channel MAC protocol. FIG. 2 is a diagram schematically showing a dedicated control channel approach method, FIG. 3 is a diagram schematically showing a split phase approach method, FIG. 4 is a diagram schematically showing a common hoping method, and FIG. 5 is a diagram schematically showing a multi channel MAC method.

First, referring to FIG. 2, in the dedicated control channel access method, among three channels as the multi channels, e.g., Ch1 202, Ch2 204, and Ch3 206, e.g., Ch1 202 is used as a dedicated channel for transmitting and receiving a control signal and Ch2 204 and Ch3 206 as the rest of the channels are used as channels for transmitting and receiving data. As a result, a request to send (RTS) packet, a clear to send (CTS) packet, and an RSV packet are transmitted through the Ch1 202 and a data packet and an acknowledgment (ACK) signal depending on reception of the data packet are transmitted through the other channels 204 and 206. Herein, channel negotiation of the Ch2 204 and the Ch3 206 is performed to acquire a data transmission channel by transmitting the RTS and the CTS packets through the Ch1 202 as the dedicated channel to transmit the data packet through the acquired data channel.

In the dedicated control channel approach method, the control channel and the data channel are separated from each other. Therefore, the data packet is correspondingly transmitted in the data channel depending on transmission and reception of the RTS and CTS packets transmitted through the dedicated channel as the control channel, and as a result, synchronization for transmitting the data packet through the multi channels is not required. Further, in the dedicated channel access method, the RTS and CTS packets are transmitted rendezvous and competitively in order to transmit the data packet in the dedicated channel as the control channel. In addition, in the dedicated channel access method, since two transceiver modules where both a transmitting module and a receiving module are implemented in one device that transmits and receives the data in order to transmit and receive the data, complexity of the apparatus and power consumption increase and since there is a limit in allocation of the dedicated channel in order to transmit the data packet, the control channel is concentrated and when the multi channels have a narrow band, a rate occupied by the control channel in all available channels increases, and as a result, the channel can be inefficiently used.

Referring to FIG. 3, in the split phase access method, time phases of three channels as the multi channels, e.g., a Ch0 302, a Ch1 304, and Ch2 306 are divided to be used as different phases, for example, the time phases are divided into a control phase 310 and a data transfer phase 330, a HELLO signal, an ACK signal, and an RSV packet are transmitted through the Ch0 302 of the multi channels in the control phase 310 and the RTS packet, the CTS packet, the ACK signal, and the data packet are transmitted through the Ch0 302 and the Ch1 304 of the multi channels in the data transmission phase 320.

In the split phase access method, the time phase is divided into the control phase 310 and the data transmission phase 320, such that a control related signal is transmitted in the control phase 310 and a data packet related signal, e.g., a channel negotiation related packet for transmitting the data packet and the data packet are transmitted. Therefore, the split phase access method can be implemented through a single transceiver. Herein, in the split phase access method, negotiation for transmitting the data packet, i.e., the RTS packet and the CTS packet are transmitted through not a dedicated channel but a common channel where the data packet is transmitted, unlike the dedicated channel access method.

Further, in the split phase access method, as the RTS packet and the CTS packet are transmitted through the common channel in the channel negotiation for transmitting the data packet in the data transmission phase 320, synchronization is required to transmit the data packet through the multi channels by transmitting the RTS packet and the CTS packet through for example, Ch0 302 and Ch1 304. In addition, in the split phase access method, when a packet size of the control related signal transmitted through the multi channels, e.g., the Ch0 302 is small in the control phase 310, all the multi channels of the control phase 310 are allocated in order to transmit a packet having a small size, and as a result, use efficiency of the limited channel may deteriorate.

Referring to FIG. 4, in the common hopping method, all the STAs which intend to perform communication accessing four channels as the multi channels, e.g., a Ch0 402, a Ch1 404, a Ch2 406, and a Ch3 408 every respective phases 1, 2, . . . , 11 operate in response to a common hopping sequence and the channel negotiation is performed through the common hopping sequence, that is, the RTS packet and the CTS packet are transmitted through the multi channels. Herein, in the common hopping method, the RTS packet is transmitted in a predetermined time phase from the Ch0 402 to the Ch4 408 among the multi channels and in this case, when the channel negotiation is achieved through the transmission of the CTS packet, that is, when a channel for transmitting the data packet is acquired, the channel where the channel negotiation is achieved is left and the data packet and the ACK signal with respect to the reception of the data packet or not are transmitted through the left channel 410.

In the common hopping method, when the channel negotiation is achieved through a common hopping sequence for each time phase in the multi channels, the channel in which the channel negotiation is achieved is left and the data packet is transmitted through the left channel, such that the common hopping method can be implemented through the single transceiver. In addition, in the common hopping method, the channel negotiation, that is, the RTS packet and the CTS packet are transmitted through the common channel and the data packet is transmitted through the channel in which the channel is negotiated, such that synchronization is required to transmit the data packet through the multi channels and switching is required respectively in response to the common hopping sequence, and as a result, a switching penalty exists.

In the aforementioned three methods, that is, the dedicated control channel access method, the split phase access method, and the common hopping method, only one rendezvous channel is included only in a given time phase. Herein, in the dedicated control channel access method and the split phase access method, the Ch1 202 and the Ch0 302 are the rendezvous channels and in the common hopping method, one rendezvous channel may be variously changed in the given time phase according to the common hopping sequence. In this case, a parallel rendezvous protocol allows one or more rendezvous channels.

Next, referring to FIG. 5, in the multi channel MAC method, access nodes for each STA, e.g., an access node 1 node1 and an access node 3 node3 operate waiting to send 510, RTS packet, CTS packet, and data packet transmission RTS/CTS/DATA 520, hopping stopped during data transfer 530, and hopping resumes 540 in respective time phases through two channels as multi channels, e.g., a Ch0 504 and a Ch1 502. Herein, the Ch0 504 and the Ch1 502 as channels in which interference among the channel is minimized may be independent channels, and as a result, when the data packet is transmitted through the multi channels including the Ch0 504 and the Ch1 502, interference in transmission is minimized to improve the overall data throughput of the system. In FIG. 5, the waiting to send 510 first exists in the Ch1 502, packet transmission 520 occurs in the Ch0 504, and hopping to the Ch1 502 is stopped according to the packet transmission 520 and thereafter, hopping between the Ch1 502 and the Ch0 504 exists by the hopping resumes 540.

In the multi channel MAC method, the STAs performs hopping in the multi channels and when a probability for transmitting the packet in a visit channel in which the STAs visit in one predetermined channel in the multi channels is p, a home channel of the visit channel is recognized by using a seed of the visit channel and the home channel is returned after the packet transmission is completed.

Herein, in the WLAN system according to the embodiment of the present invention, an MAC protocol such as a multi channel carrier sense multiple access (CSMA) (hereinafter, referred to as a 'CSMA') protocol is applied as well as the multi channel MAC protocol and as the multi channel CSMA protocol is applied, the performance is improved, for example, the multi CSMA channel has more excellent execution performance than a single CSMA channel in the case of a fixed collective bandwidth. In addition, the multi channel CSMA protocol acquires more excellent performance than the single channel having the data throughput in an MAC layer without a linear scale such as a data throughput in a physical (PHY, hereinafter, referred to as 'PHY') layer. In particular, as the multi channel CSMA protocol is applied, numerous collisions which can occur simultaneously in response to simultaneous transmission of the data packet are removed, thereby increasing an MAC data throughput. Then, herein, the transmission of the RTS.CTS packet through the multi channels for supporting access in the communication system according to the embodiment of the present invention will be described in more detail with reference to FIGS. 6 to 10.

FIGS. 6 to 10 are schematic diagrams of a frame structure for supporting access to multi channels in the communication system according to the embodiment of the present invention. Herein, FIGS. 6 to 10 are diagrams showing a frame structure for supporting access so that the WLAN system according to the embodiment of the present invention transmits the RTS packet or CTS packet by searching a usable band for transmitting the RTS packet or CTS packet in the multi channels and thereafter, performing ad-hoc to the searched usable band through the ad-hoc multi channel MAC protocol. In this case, the WLAN system searches the usable band, e.g., the band in which the interference or collision is minimum as the usable band by considering interference or collision by a band which a predetermined STA already occupies and uses, that is, by a band which the predetermined STA accesses in the multi channels.

Figure 6:
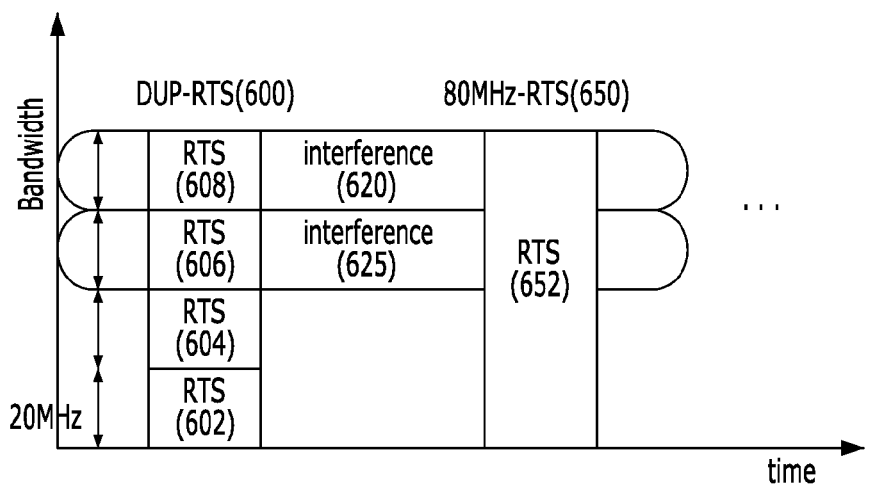
FIGS. 6 to 10 are schematic diagrams of a frame structure for supporting access to multi channels in the communication system according to the embodiment of the present invention.

First, referring to FIG. 6, the WLAN system searches a usable band for transmitting the RTS packet in a duplicate-RTS band 600 of a 80 MHz-RTS band 650 when predetermined STAs transmit an RTS packet 652 to the 80 MHz-RTS band 650 in a multi channel bandwidth and in this case, the WLAN system searches the usable band by considering interference bands 620 and 625. Herein, the WLAN system divides the multi channel into sub channels to search the usable band among a plurality of bands.

In addition, the WLAN system searches a band which is not overlapped with the interference bands 620 and 625 in the usable bands, that is, RTS bands 602 and 604 in the duplicate-RTS band 600 to support the access to transmit the RTS packet. Herein, while one predetermined RTS band is used between the RTS bands 602 and 604, when it is difficult to use the RTS band, that is, when the access to the accessed RTS band is not maintained, the access is supported to use the RTS band by performing ad-hoc to one remaining RTS band through the ad-hoc multi channel MAC protocol.

Further, when it is difficult for another predetermined STA, e.g., an STA having a priority to the searched RTS bands 602 and 604 to use the searched RTS bands 602 and 604 while the RTS packet is transmitted through the RTS bands 602 and 604, that is, when the access to the accessed RTS band is not maintained, RTS bands 606 and 608 which are overlapped with the interference bands 620 and 625 are searched as the usable band and the RTS packet is supported to be transmitted by performing ad-hoc to the RTS bands 606 and 608 through the ad-hoc multi channel MAC protocol.

Figure 7:
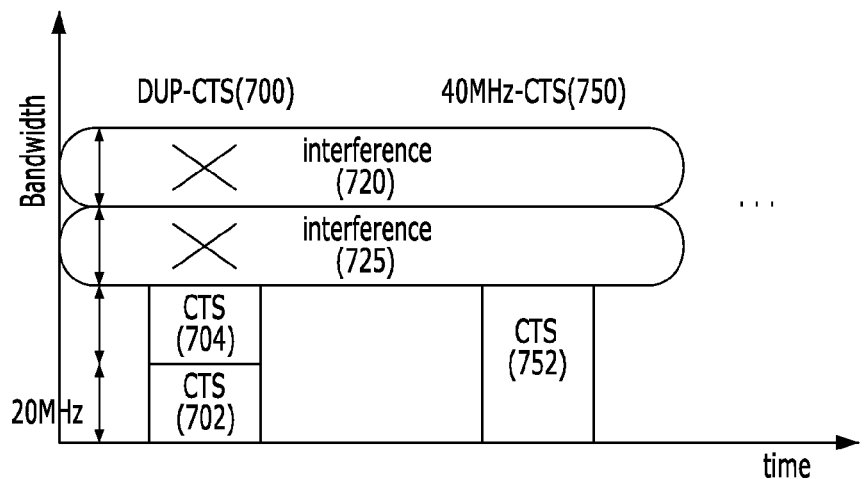

In addition, referring to FIG. 7, the WLAN system searches a usable band for transmitting the CTS packet in a duplicate-CTS band 700 of a 40 MHz-CTS band 750 when predetermined STAs transmit a CTS packet 752 to the 40 MHz-CTS band 750 in the multi channel bandwidth and in this case, the WLAN system searches the usable band by considering the interference bands 620 and 625. Herein, the WLAN system divides the multi channel into the sub channels to search the usable band among the plurality of bands.

Moreover, the WLAN system searches a band which is not overlapped with the interference bands 720 and 725 as usable bands, that is, CTS bands 702 and 704 in the duplicate-CTS band 700 to support the access to transmit the CTS packet. Herein, while one predetermined CTS band is used between the CTS bands 702 and 704, when it is difficult to use the CTS band, that is, when the access of the accessed CTS band is not maintained, the access is supported to use the CTS band by performing ad-hoc to one remaining CTS band through the ad-hoc multi channel MAC protocol.

Figure 8:
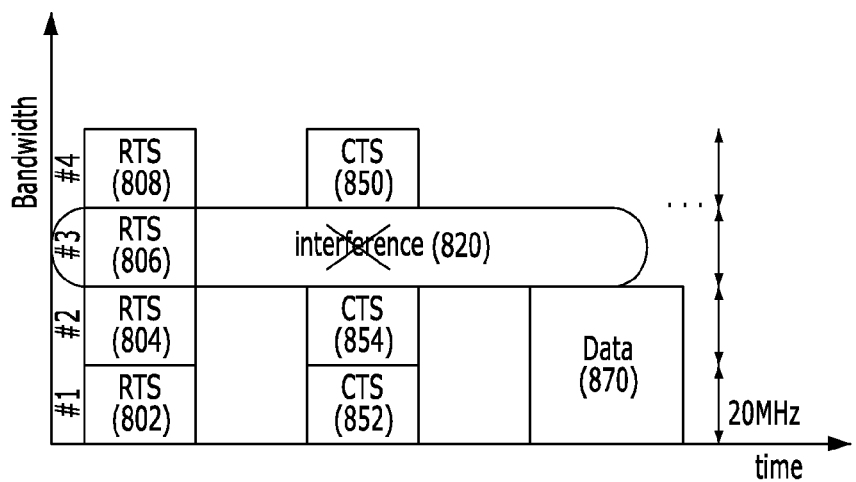

Further, referring to FIG. 8, the WLAN system searches a usable band for transmitting the CTS packet in 80 MHz-RTS bands 802,804,806,808 when predetermined STAs transmit the RTS packet to the 80 MHz-RTS bands 802,804,806,808 (sub channel 1, sub channel 2, sub channel 3, and sub channel 4) in the multi channel bandwidth and in this case, the WLAN system searches the usable band by considering the sub channel and the band 820 where the interference exists. Moreover, the WLAN system searches bands of the sub channels adjacent to each other according to the size of the data, i.e., the sub channel 1 and the sub channel 2 as a data band 870. Herein, the WLAN system divides the multi channel into the sub channels to search the usable band among the plurality of bands.

In addition, the WLAN system supports the access to transmit the CTS packet by searching the RTS band 806 where the interference exists in the 80 MHz-RTS bands 802, 804, 806, and 808, that is, a band which can use the rest of the sub channels except for the sub channel 3, in other words, CTS bands 850, 852, and 854.

Further, the WLAN system supports the access to use the RTS band or CTS band by performing ad-hoc to the rest of the RTS bands and the CTS bands through the ad-hoc multi channel MAC protocol when it is difficult to use a predetermined RTS band or CTS band, that is, when the access to the accessed CTS band is not maintained when the predetermined RTS band or CTS band is used in the RTS bands 802, 804, 806, and 808 and the CTS bands 950, 852, and 854.

Figure 9:
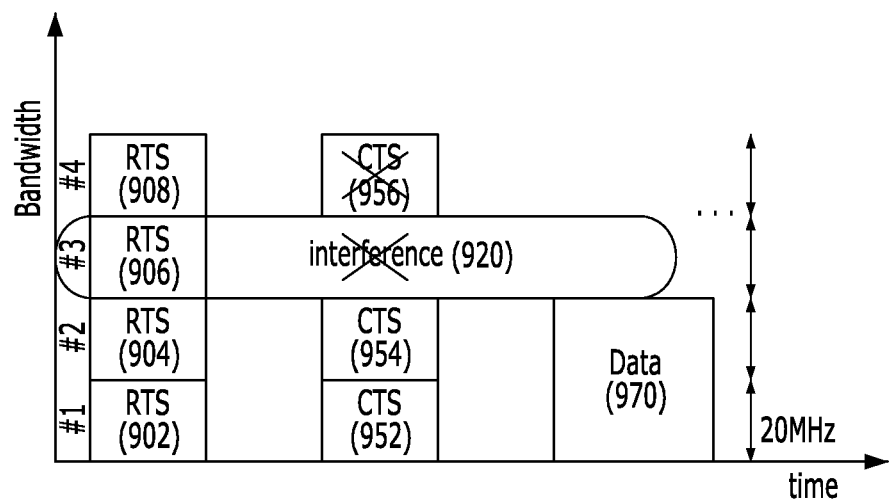

Moreover, referring to FIG. 9, the WLAN system searches a usable band for transmitting the CTS packet in RTS bands of 80 MHz-RTS bands 902, 904, 906, and 908 when predetermined STAs transmit the RTS packet to the 80 MHz-RTS bands 902, 904, 906, and 908 (sub channel 1, sub channel 2, sub channel 3, and sub channel 4) in the multi channel bandwidth and in this case, the WLAN system searches the usable band by considering the sub channel and the band 920 where the interference exists. Moreover, the WLAN system searches bands of the sub channels adjacent to each other according to the size of the data, i.e., the sub channel 1 and the sub channel 2 as the data band 870. Herein, the WLAN system divides the multi channel into the sub channels to search the usable band among the plurality of bands.

In addition, the WLAN system searches the RTS band 906 where the interference exists in the 80 MHz-RTS bands 902, 904, 906, and 908, that is, a band which can use the rest of the sub channels except for the sub channel 3, in other words, CTS bands 952, 954, and 956. Herein, the WLAN system supports the access to transmit the CTS packet to the band which can the CTS bands 952 and 954 except for the CTS band 956 by considering the interference band 920 in the case of the 40 MHz-CTS band by setting the sub channel 1 as a primary channel in the CTS packet transmission.

Further, the WLAN system supports the access to use the RTS band or CTS band by performing ad-hoc to the rest of the RTS bands or the CTS bands through the ad-hoc multi channel MAC protocol when it is difficult to use a predetermined RTS band or CTS band, that is, when the access to the accessed CTS band is not maintained when the predetermined RTS band or CTS band is used in the RTS bands 902, 904, 906, and 908 and the CTS bands 952 and 954.

Figure 10:
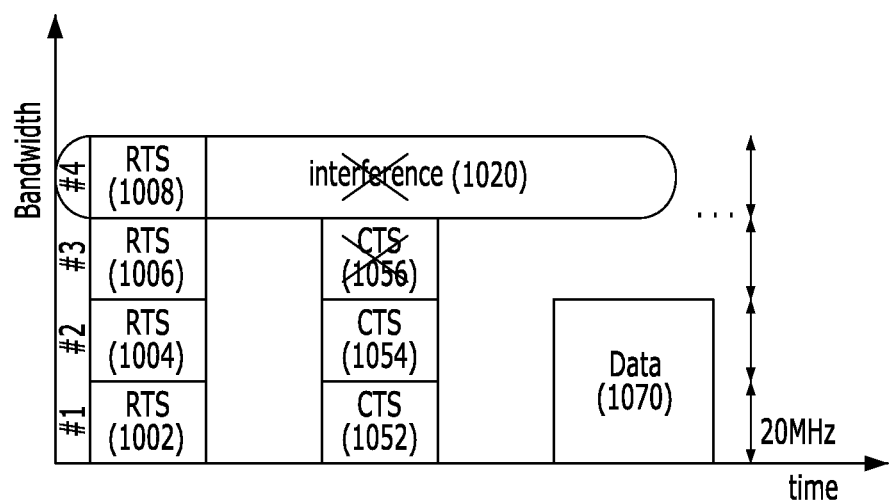

In addition, referring to FIG. 10, the WLAN system searches a usable band for transmitting the CTS packet in 80 MHz-RTS bands 1002, 1004, 1006, and 1008 when predetermined STAs transmit the RTS packet to the 80 MHz-RTS bands 1002, 1004, 1006, and 1008 (sub channel 1, sub channel 2, sub channel 3, and sub channel 4) in the multi channel bandwidth and in this case, the WLAN system searches the usable band by considering the sub channel and the band 1020 where the interference exists. Moreover, the WLAN system searches bands of the sub channels adjacent to each other according to the size of the data, i.e., the sub channel 1 and the sub channel 2 as the data band 1070. Herein, the WLAN system divides the multi channel into the sub channels to search the usable band among the plurality of bands.

In addition, the WLAN system searches the RTS band 1008 where the interference exists in the 80 MHz-RTS bands 1002, 1004, 1006, and 1008, that is, a band which can use the rest of the sub channels except for the sub channel 4, in other words, CTS bands 1052, 1054, and 1056. Herein, the WLAN system supports the access to transmit the CTS packet to the band which can use the CTS bands 1056 and 1054 except for the CTS band 1056 by considering the interference band 1020 in the case of the 40 MHz-CTS band by setting the sub channel 1 as the primary channel in the CTS packet transmission.

Further, the WLAN system supports the access to use the RTS band or CTS band by performing ad-hoc to the rest of the RTS bands or the CTS bands through the ad-hoc multi channel MAC protocol when it is difficult to use a predetermined RTS band or CTS band, that is, when the access to the accessed CTS band is not maintained when the predetermined RTS band or CTS band is used in the RTS bands 1002, 1004, 1006, and 1008 and the CTS bands 1052 and 1054. Then, herein, an apparatus for supporting access that supports ah-hoc through the ad-hoc multi channel MAC protocol in the multi channel as described above in the communication system according to the embodiment of the present invention will be described in more detail.

Figure 11:
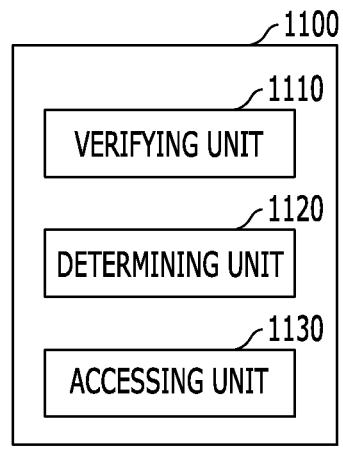
FIG. 11 is a schematic diagram of a structure of an apparatus for supporting access in a communication system according to an embodiment of the present invention.

FIG. 11 is a schematic diagram of a structure of an apparatus for supporting access in a communication system according to an embodiment of the present invention. Herein, FIG. 11 is a diagram showing an apparatus for supporting access, which allows the plurality of STAs to access one AP through the multi channels in the WLAN system according to the embodiment of the present invention and the apparatus for supporting access is included in the AP to support the accesses of the STAs. In particular, the AP supports ad-hoc of the STAs through the ad-hoc multi channel MAC protocol in the multi channels to support access the AP itself as described above.

Referring to FIG. 11, the apparatus for supporting access includes a verifying unit 1110 verifying the sub channel occupied and used by the STAs in the multi channel and searching the usable band in the multi channel, a determining unit 1120 determining the searched usable band as the RTS/CTS band for transmitting the RTS/CTS packet, and accessing unit 1130 supporting access to the AP in the multi channel through the determined RTS/CTS band.

Herein, the verifying unit 1110 verifies a plurality of STAs to be accessed through the multi channel, a plurality of access nodes of the STAs, and sub channels used by the STAs, that is, sub channels which the STAs access. In addition, the verifying unit 1110 divides the multi channel into the sub channels to search the usable band among the plurality of bands and in this case, the verifying unit 1110 searches the usable band by considering sub channels where the interference or collision occurs in the multi channel, that is, the bands.

Further, the determining unit 1120 performs ad-hoc to other searched usable bands to allow the AP to access the correspond bands when it is difficult to use the RTS/CTS band which is being used, that is, the access to the accessed RTS/CTS band is not maintained by supporting ad-hoc through the ad-hoc multi channel MAC protocol in the multi channel. In other words, while the usable band which the predetermined STA accesses is used, when other predetermined STA, e.g., an STA having a primary with respect to the accessed and used band accesses the usable band, the determining unit 1120 supports ad-hoc through the ad-hoc multi channel MAC protocol to allow the predetermined STA to access other usable bands. Then, herein, an operation for supporting access in the multi channel in the communication system according to the embodiment of the present invention will be described in more detail with reference to FIG. 12.

Figure 12:
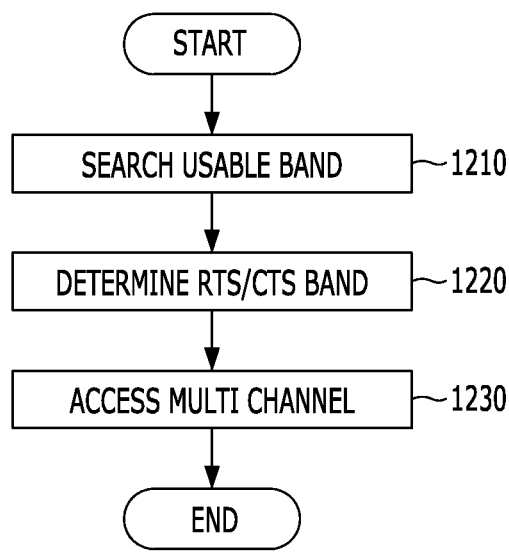
FIG. 12 is a diagram schematically showing an operating process of the apparatus for supporting access in the communication system according to the embodiment of the present invention.

FIG. 12 is a diagram schematically showing an operating process of the apparatus for supporting access in the communication system according to the embodiment of the present invention. Herein FIG. 12 is a diagram schematically showing an operation for supporting the plurality of STAs to access one AP through the multi channel in the WLAN system as described above.

Referring to FIG. 12, the access supporting apparatus verifies the sub channel occupied and used by the STAs in the multi channel and searches the usable band in the multi channel at step 1210.

In addition, at step 1220, the searched usable band is determined as the RTS/CTS band for transmitting the RTS/CTS packet and thereafter, at step 1230, the access to the AP in the multi channel through the determined RTS/CTS band is supported. Herein, since supporting the accesses of the plurality of STAs to one AP in the multi channel has been described in detail above, a detailed description thereof will be herein omitted.

As set forth above, according to an apparatus and a method for supporting access in a communication system, by supporting a multi channel MAC technology in a communication system in a multi user network environment having multi users, multi users easily access a network and the multi users can smoothly perform communication through the respective nodes. In addition, the multi users perform communication through the multi nodes, respectively by applying a multi channel MAC technology to maximize use efficiency of resources by efficiently using a limited channel (e.g., multi channels) and stably provide services to the multi users through multi channels.

While the present invention has been described with respect to the specific embodiments, it will be apparent to those skilled in the art that various changes and modifications may be made without departing from the spirit and scope of the invention as defined in the following claims. Therefore, it is to be understood that the invention is not limited to the disclosed embodiments, but, on the contrary, is intended to cover various modifications and equivalent arrangements included within the spirit and scope of the appended claims.

What is claimed is:

1. An apparatus for supporting access in a communication system, the apparatus comprising:
    a verifying unit configured to search for bands usable by stations (STAs) that are to access an access point in a multi channel;
    a determining unit configured to determine a transmission band for packet transmission in the usable bands; and
    an accessing unit configured to support access to the access point through the determined transmission band,
    wherein the determining unit determines the transmission band by performing an ad-hoc operation through an ad-hoc media access control (MAC) protocol in the usable bands.

2. The apparatus of claim 1, wherein the determining unit determines a new transmission band in the usable bands through the ad-hoc MAC protocol when the access to the transmission band which accesses the access point is not maintained, and
    wherein the accessing unit supports the access to the access point by performing the ad-hoc operation on the new transmission band.

3. The apparatus of claim 1, wherein the verifying unit divides the multi channel into a plurality of sub channels to verify the sub channels and bands and verifies the STAs and access nodes of the STAs.

4. The apparatus of claim 3, wherein the verifying unit verifies sub channels and bands accessed by the STAs among the sub channels and searches for the usable bands by considering interference by the accessed sub channels and bands.

5. The apparatus of claim 1, wherein the transmission band is a request to send (RTS) band or a clear to send (CTS) band.

6. The apparatus of claim 1, wherein the verifying unit searches for the usable bands in the clear to send (CTS) bands duplicated with request to send (RTS) bands of the multi channel, and
    wherein the determining unit determines a CTS band for transmitting a CTS packet in the usable bands.

7. The apparatus of claim 1, wherein the verifying unit searches for the usable bands in request to send (RTS) bands duplicated with clear to send (CTS) bands of the multi channel, and
    wherein the determining unit determines an RTS band for transmitting an RTS packet in the usable bands.

8. A method for supporting access in a communication system, the method comprising:
    searching for bands usable by STAs that are to access an access point in a multi channel;
    determining a transmission band for packet transmission in the usable bands; and
    supporting access to the access point through the determined transmission band,
    wherein in the determining, the transmission band is determined by performing an ad-hoc operation through an ad-hoc media access control (MAC) protocol in the usable bands.

9. The method of claim 8, wherein the determining comprises determining a new transmission band in the usable bands through the ad-hoc MAC protocol when access to the transmission band which accesses the access point is not maintained, and
    wherein the supporting comprises supporting the access to the access point by performing the ad-hoc operation on the new transmission band.

10. The method of claim 8, wherein the supporting comprises:
    dividing the multi channel into a plurality of sub channels to verify the sub channels and bands; and
    verifying the STAs and access nodes of the STAs.

11. The method of claim 10, wherein the searching comprises:
    verifying sub channels and bands accessed by the STAs among the sub channels; and
    searching for the usable bands by considering interference by the accessed sub channels and bands.

12. The method of claim 8, wherein the transmission band is a request to send (RTS) band or a clear to send (CTS) band.

13. The method of claim 8, wherein the searching comprises searching for the usable bands in clear to send (CTS) bands duplicated with request to send (RTS) bands of the multi channel, and
    wherein the determining comprises determining a CTS band for transmitting a CTS packet in the usable bands.

14. The method of claim 8, wherein the searching comprises searching for the usable bands in request to send (RTS) bands duplicated with clear to send (CTS) bands of the multi channel, and
    wherein the determining comprises determining an RTS band for transmitting an RTS packet in the usable bands.

* * * * *